Patented Dec. 4, 1945

2,390,217

UNITED STATES PATENT OFFICE 2,390,217

COATING AND COATING METHODS

Joseph L. Krieger, Baltimore, Md.

No Drawing. Application September 23, 1941,
Serial No. 411,993

8 Claims. (Cl. 106—193)

This invention relates to methods for improving the stability of lacquer compositions, containing bronzes or copper powder.

An object of the present invention is the preparation of lacquer compositions containing bronzes or copper powder known as "bronzing lacquers" which are markedly resistant to gelling and/or green discoloration.

Considerable improvement has been effected in recent years in the manufacture of lacquer raw materials and selective lacquer formulations with respect to acidity of the nitrocellulose solvents, and resins as a result of which the phenomena of "gelling" or "livering" of lacquers has been lessened to a very marked degree. However, when bronzes or copper powder are added to these improved clear bronzing lacquers, the resulting compositions gel readily and the solutions acquire a decided greenish tint. Although a number of stabilizers or gel inhibitors have been recorded in the literature and are in commercial use, it is still common practice to ship clear bronzing lacquers and to add the bronze powders prior to their use and to ship such lacquers at a consistency which will require reduction or thinning before use.

I have now discovered that the gelling and discoloration of clear bronzing lacquers containing bronzes or copper powder can be prevented by the addition to the lacquer compositions of small percentages of finely divided metals higher than copper in the electromotive force series of elements or having a higher electrode potential than copper as reported on page 981 of the 22nd edition of the Handbook of Chemistry and Physics published by the Chemical Rubber Publishing Company of Cleveland, Ohio.

It is believed that the mechanism involved in the effectiveness of these metals for the purpose of this invention lies in the fact that the gelling and discoloration of bronzes or copper containing bronzing lacquers are due to the presence of small percentages of copper salts which serve to accelerate the oxidation of such lacquer compositions to organic acids which dissolve additional copper and thereby intensify the difficulty. By the addition of small percentages of metals higher than copper in the electromotive force series of elements, any copper already in solution in the lacquer compositions, or which dissolves therein upon standing is displaced by the added metal which in turn is dissolved in the lacquer composition involved.

Some of the metals higher than copper in the E. M. F. series oxidize too readily in contact with air, for example: lithium, rubidium, potassium, strontium, barium, calcium, sodium and magnesium, and hence these metals can only be used in lacquer compositions in which air is rigidly excluded, since they are not so effective when coated with a layer of the corresponding oxide. Moreover, it is not convenient to prepare some of these metals in powdered form except in a dispersed condition in a solvent as for example finely divided sodium in benzene or toluene.

Those metals higher than copper in the E. M. F. series of elements which are known to be oxidation accelerators, including manganese, cobalt, nickel and lead are preferably not used for the purposes of this invention because, even though they may prevent the discoloration due to dissolved copper, they in turn, because of their solution in the lacquer compositions, as they displace the dissolved copper, also serve to accelerate oxidation and eventually the gelling and even the discoloration of the lacquer compositions involved. Aluminum is not particularly desirable since it is known that lacquer compositions containing aluminum powder also have a tendency to gel although to a considerably lesser degree than the same lacquer compositions containing bronzes or copper powder.

Among the more available and effective metals which have been found desirable for the purposes of this invention are cadmium, zinc, chromium, iron and tin. Somewhat less effective are the metals antimony, bismuth and arsenic. In place of the metals which have been found desirable for the purposes of this invention, metallic compounds which decompose readily to form the free metals may also be used. For example, the metal alkyls such as cadmium, diethyl, zinc dimethyl, antimony triethyl; the metal carbonyls, such as iron carbonyl, may be used.

The lacquer compositions referred to in this invention are generally those containing appreciable amounts of nitrocellulose dissolved in a suitable solvent or mixture of solvents and diluted with one or more non-solvents and also containing one or more plasticizers and one or more resins or ester gums. Bronze lacquers are mixtures of these nitrocellulose compositions with a bronze or copper powder, or powders, and are used to coat metals, wood, etc., to give attractive decorative effects. The bronze powder is frequently added to the thinner which in turn is mixed with the lacquer. It is also the object of the present invention to prevent the gelling and discoloration of lacquers having either cellulose acetate or other cellulose compounds such as ethyl cellulose, cellulose acetobutyrate and cellulose acetopropionate as the base in place of cellulose nitrate, even though it is recognized that these latter type of lacquers do not gel or discolor as readily as do the nitrocellulose lacquer compositions. It is also the object of the present invention to prevent the gelling and discoloration of the aforesaid lacquer compositions when such compositions are packaged or stored in regular tin cans or other metal containers or in containers of any sort.

Metals that are used according to the present invention are preferably admixed in finely powdered form with the bronze powders in concentrations of 0.10% to 5% or even higher percentages based on the amount of the bronze powder or copper powder added to the lacquer. Although the higher concentrations of powdered metals are most effective for the prevention of gelling and/or discoloration of lacquers containing bronzes, the amount that can be added is limited by the fact that the metals that are effective are, in their finely powdered condition, generally gray in color and hence tend to dull the appearance of the bronze colors. Accordingly, it is preferable to use the lower concentrations of powdered metal so as to have the least effect upon the appearance of the bronze powders. Instead of adding the metal powder to the bronze, the metal powder may be dispersed in a suitable diluent and the bronze powder added to the same diluent or to another diluent and the diluents then added in the desired proportions to the lacquer compositions to obtain a better dispersion of the added metal through the bronze powder and the lacquer composition. When readily decomposable metal compounds described above are used, they may be added directly to the lacquer compositions prior to the addition of the bronze or copper powders. The following examples illustrate the invention.

*Example 1*

To 100 grams of nitrocellulose lacquer of the following approximate composition:

| | Per cent |
|---|---|
| 20 sec. nitrocellulose (wet) | 16.00 |
| Resin solution | 15.00 |
| Plasticizer | 5.00 |
| Acetates | 25.00 |
| Hydrocarbons | 21.00 |
| Alcohols | 18.00 | contained in a stoppered glass bottle was added 30 grams of bronze powder and the bottle rotated end over end in a pebble-ball mill so as to expose fresh surfaces of the bronze powder to the lacquer compositions. It was noted that at the end of fifteen minutes the lacquer took on a greenish tinge and at the end of 2 hours showed signs of gelling as indicated by an increase in viscosity.

*Example 2*

An experiment was carried out under the same conditions as in Example 1 except that 0.5 gram of cadmium powder was thoroughly admixed with the bronze powder prior to its addition to the lacquer composition. After 120 hours of continuous rotation in the pebble-ball mill, no green discoloration of the lacquer composition could be seen and there was no evidence of gelling as indicated by no increase in viscosity of the lacquer composition. The appearance of the bronze in the lacquer was bright at the beginning of the experiment and the lustre remained practically unchanged throughout the experiment.

*Example 3*

Into each of three cork-stoppered bottles there was placed 25 cc. of a clear light yellow nitrocellulose bronzing lacquer sold commercially as a "clear bronzing lacquer." To one of these bottles was added 4 grams of "Sapolin" bronze powder (sample A). To another bottle was added 4 grams of "Sapolin" bronze powder and 0.4 cc. of a commercial stabilizing agent for the prevention of gelling of lacquers (sample B); and to the third bottle was added 4 grams of "Sapolin" bronze powder containing thoroughly admixed therewith 200 milligrams of cadmium powder (sample C). After making up these samples they were stoppered and shaken carefully to distribute the bronze powder throughout the lacquer. The three bottles were allowed to stand at room temperature and were shaken at the end of each 8-hour interval. The appearance of these samples was observed at the end of each 24-hour period with the following results:

| | Appearance of supernatant lacquer layer after expiration of— | | | | |
|---|---|---|---|---|---|
| | 24 hrs. | 48 hrs. | 72 hrs. | 96 hrs. | 240 hrs. |
| Sample A (blank) | Distinct green color. | Deeper green color. | Green color more intense than after 48 hrs. | Green color of increased intensity. | Very deep green color. |
| Sample B (lacquer containing commercial stabilizing agent). | Original light yellow color. | Very light green color. | Distinct green color. | Green color more intense. | Green color more intense. |
| Sample C (lacquer containing cadmium powder). | Original light yellow color. | Original light yellow color. | Original light yellow color. | Original light yellow color. | Original light yellow color. |

It is apparent that, even after 10 days (240 hours) of standing, the bronze lacquer composition containing the cadmium powder (sample C) still retained its original color and showed no signs of gelling whereas the bronze lacquers that contained no inhibitor (sample A) turned green within 24 hours and at the end of 240 hours was a deep green and had increased considerably in viscosity. The improvement over the bronze lacquer containing a commercial stabilizing agent (sample B) is also noteworthy.

*Example 4*

In an experiment similar to Example 2, except that 1.5 grams of powdered cadmium was used in place of the 0.5 gram used in Example 2, the bronze lost its bright lustre to an appreciable extent although after 120 hours of shaking in the pebble-mill, there was no indication of green discoloration or evidences of gelling. The lacquer composition was gray, however, due to the presence of dispersed particles of cadmium powder.

Inasmuch as some bronzing lacquers are more prone to discoloration and gelling when bronze powder is added than others, the amount of metal powder required for a given amount of bronze-containing lacquer will be greater, the more readily the bronzing lacquer tends to discolor or gel. Accordingly, by increasing the amount of metal powder added, even low grade bronzing lacquers containing bronze powder may be stabilized.

It has also been found that some lacquers containing bronze when packaged in tin cans or other metal containers show a greater tendency to discolor and/or gel than when stored in non-metal containers, as for example in a glass container. For such lacquers, it is preferable to add a somewhat greater amount of metal powder when the said lacquer containing a bronze powder is to be stored or packaged in metal containers than when stored or packaged in glass or other non-metal containers.

In the case of metals higher in the E. M. F. series of elements, lesser quantities of these metals are generally required for a given effectiveness in preventing gelling or discoloration than a metal lower in the E. M. F. series of elements. This is illustrated by the following table which shows the amount of different powdered metals that had to be added to the bronze powder-lacquer composition described in Example 1 to just prevent gelling at the expiration of 120 hrs. as measured by a 20% increase in viscosity of the lacquer composition as determined by the falling ball method.

| Metal added | Electrode potential | Metal based on bronze powder | Time required for 20% increase in viscosity of bronze lacquer composition |
|---|---|---|---|
|  |  | Percent | Hours |
| Zinc | +0.7618 | 0.4 | 120 |
| Chromium | +0.557 | 1.2 | 120 |
| Cadmium | +0.441 | 1.6 | 120 |
| Tin | +0.136 | 2.2 | 120 |
| Antimony | −0.10 | 4.0 | 120 |
| Bismuth | −0.226 | 5.0 | 120 |
| Arsenic | −0.30 | 5.5 | 120 |

It is also the object of this invention to prevent the gelling of lacquer compositions containing metal powders in which no copper is present as for example the gelling of lacquer compositions containing aluminum powder. It is known that altho such compositions do not become green or change with respect to color, they also have a tendency to gel over long periods of time. By the addition to such lacquer compositions of small percentages of metals having a higher electromotive potential than aluminum, the gelling of such lacquer compositions can be prevented for much longer periods of time. Metals which are suitable for this purpose include barium, calcium, strontium and magnesium. Because of the tendency of these metals to oxidize, it is preferable to exclude air in the packaging of bronze lacquer compositions, containing these metals.

This invention is not suitable for clear lacquers used in dipping or spraying operations because the added metals are not soluble in the lacquer compositions. However, the invention is applicable to pigmented lacquers or enamels where it is particularly important to prevent the gelling of the lacquers. The invention is also applicable to lacquer compositions which may contain commercial inhibitors, stabilizing agents, dyes and the like.

This invention is not to be limited by the proposed mechanism nor are any limitations intended in the annexed claims except such that are specifically expressed or are imposed by the prior art.

What I claim is:

1. Lacquer compositions having a nitrocellulose base, of reduced tendency to gel or discolor, containing a material of the group consisting of bronze powder and copper powder to which is added from 0.1% to 5.0% by weight, based on the bronze or copper powder, of a powdered metal having a higher electrode potential than that of copper.

2. A process for the reduction of the tendency to gel and discolor of lacquer compositions having a nitrocellulose base, containing a material of the group consisting of bronze powder and copper powder, by the addition thereto of 0.1% to 5.0% by weight, based on the bronze or copper powder, of a powdered metal having an electrode potential greater than (−) 0.344.

3. A process according to claim 2 in which the added metal is powdered zinc in concentrations of 0.1% to 5.0% by weight based on the bronze or copper powder.

4. A process according to claim 2 in which the added metal is powdered cadmium in concentrations of 0.1% to 5.0% by weight based on the bronze or copper powder.

5. A process according to claim 2 in which the added metal is powdered tin in concentrations of 0.1% to 5.0% by weight based on the bronze or copper powder.

6. A process according to claim 2 in which the lacquer composition is pigmented.

7. A process according to claim 2 in which the lacquer is a lacquer enamel.

8. A process for the reduction of the gelling and discoloring tendency of lacquer compositions in sealed containers in the substantial absence of air, which lacquer compositions have a nitrocellulose base and which contain a material of the group of bronze powder and copper powder, by the addition thereto of 0.1% to 5.0% by weight, based on the bronze or copper powder, of a powdered metal selected from the group consisting of group I and group II of Mendeleeff's Periodic Arrangement of the Elements having an electrode potential greater than (−) 0.344.

JOSEPH L. KRIEGER.